US011880277B2

(12) United States Patent
Gurumurthi et al.

(10) Patent No.: US 11,880,277 B2
(45) Date of Patent: Jan. 23, 2024

(54) SELECTING AN ERROR CORRECTION CODE TYPE FOR A MEMORY DEVICE

(71) Applicant: ADVANCED MICRO DEVICES, INC., Santa Clara, CA (US)

(72) Inventors: Sudhanva Gurumurthi, Austin, TX (US); Vilas Sridharan, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 320 days.

(21) Appl. No.: 16/582,358

(22) Filed: Sep. 25, 2019

(65) Prior Publication Data
US 2021/0089398 A1 Mar. 25, 2021

(51) Int. Cl.
*G06F 11/00* (2006.01)
*G06F 11/10* (2006.01)

(52) U.S. Cl.
CPC .............................. *G06F 11/1076* (2013.01)

(58) Field of Classification Search
CPC .... G06F 11/1076; G06F 11/108; G06F 11/08; G06F 11/1012
USPC ............... 714/751, 752, 758, 762, 766, 768
See application file for complete search history.

(56) References Cited

U.S. PATENT DOCUMENTS

| 10,157,096 B2* | 12/2018 | Cai ..................... G06F 11/1048 |
| 2013/0073895 A1 | 3/2013 | Cohen |
| 2016/0301427 A1* | 10/2016 | Sprouse ............... G11C 29/028 |
| 2020/0127685 A1* | 4/2020 | Chen ................... H03M 13/152 |
| 2020/0201698 A1* | 6/2020 | Gans ................... G06F 12/0246 |

FOREIGN PATENT DOCUMENTS

WO    2006013529 A1    2/2006

OTHER PUBLICATIONS

Zhang et al., *Exploring and Optimizing Chipkill-Correct for Persistent Memory based on High-Density NVRAMs*, 51st Annual IEEE/ACM International Symposium on Microarchitecture (MICRO 2018), Oct. 2018, pp. 711-724, IEEE Computer Society, Los Alamitos, CA.
Yoon et al., *Virtualized and Flexible ECC for Main Memory*, Proceedings of the Fifteenth Edition of ASPLOS on Architectural Support for Programming Languages and Operating Systems, Mar. 2010, pp. 397-408, ACM New York, NY.
International Search Report and Written Opinion, PCT/US2020/052481, dated Feb. 8, 2021, 15 pages.

* cited by examiner

*Primary Examiner* — Christine T. Tu

(57) ABSTRACT

Selecting an error correction code type for a memory device includes: selecting, by the memory device in dependence upon predefined selection criteria, one of a plurality of error correction code types and carrying out memory access requests utilizing the selected error correction code type.

26 Claims, 10 Drawing Sheets

SELECTING AN ERROR CORRECTION CODE TYPE FOR A MEMORY DEVICE

BACKGROUND

Memory devices are being implemented in computing systems in a variety of manners. Some memory devices are direct-attached and others are connected to the host computing system through one or more fabrics. In some computing systems the various different connection types may represent or implement different layers of a memory hierarchy. The connections of two memory devices through the same fabric may even have different access characteristics due to the 'distance' (for example, number of hops) from the host system to the memory device itself. Additionally, memory devices coupled to a system with the same connection type may be implemented in a memory hierarchy. Some of the connection types, such a Non-Volatile Random Access Memory ('NVRAM') fabrics may be more unreliable in terms of data corruption over time than others.

DETAILED DESCRIPTION

Figure 1:
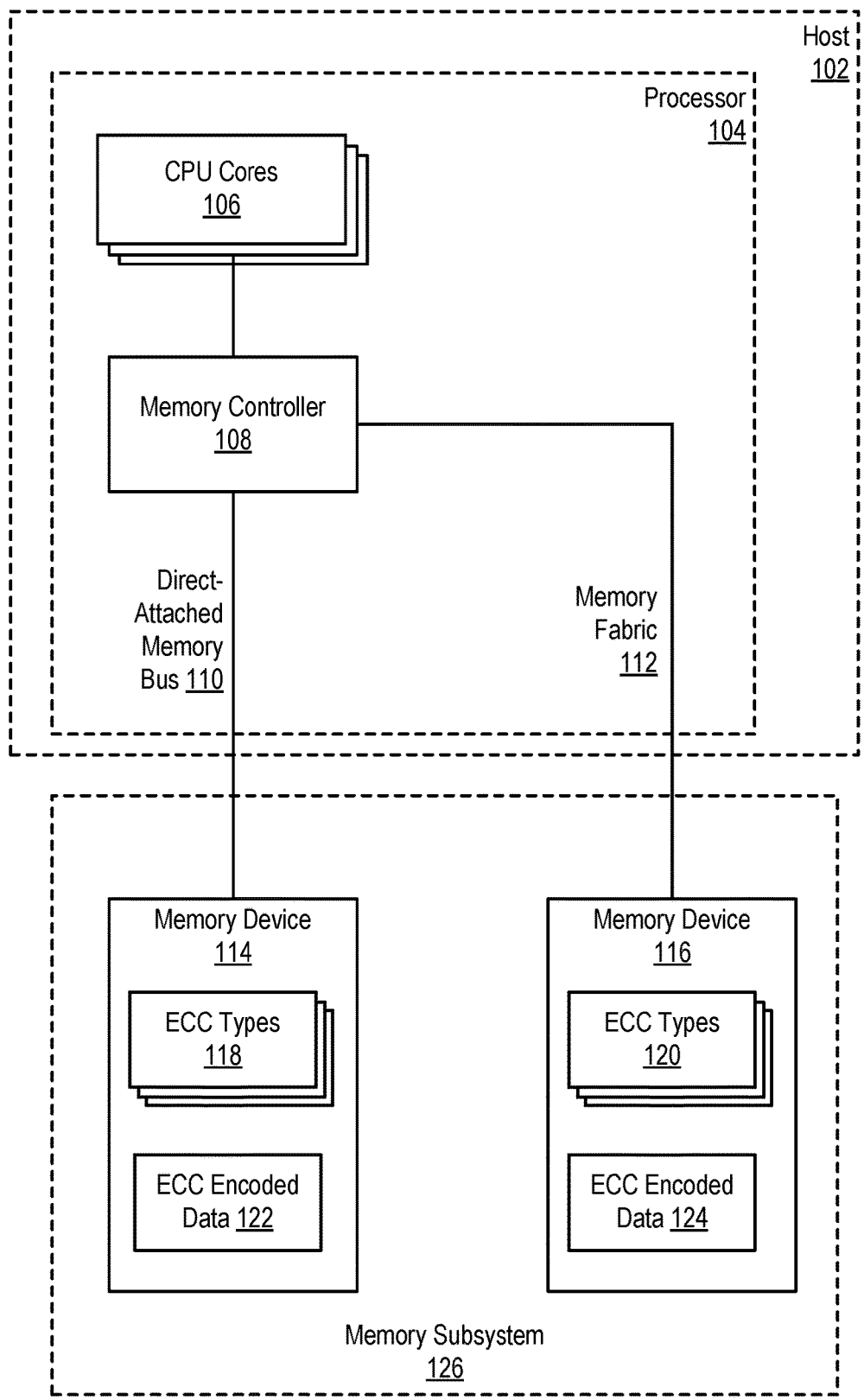
FIG. 1 sets forth a functional block diagram of an example system for selecting an error correction code type for a memory device according to embodiments of the present disclosure.

Example methods, apparatus, and products for selecting an error correction code type for a memory device are described in this specification. Various embodiments of selecting an error correction code type for a memory device are described with regard to the figures below in greater detail. Such selection of an error correction code type for a memory device, in some embodiments, includes selecting, by a memory device in dependence upon predefined selection criteria, one of a plurality of error correction code ('ECC') types. The memory device stores the ECC types on the device itself such that regardless of the system within which the memory device is implemented, the memory device selects one of the different ECC types based on the criteria. Each ECC type is of a different code-rate than the other ECC types stored on the memory device. Each of the different code-rate represents a tradeoff between code compute latency, number of faults detectable, number of faults correctable, and size of redundancy data.

The memory device selects an ECC type based on predefined selection criteria. Such predefined selection criteria includes any one or combination of: the type of connection between the memory device and the host of the system, the level of memory hierarchy within which the memory device is implemented, the communications distance between the memory device and the host system, the access patterns of data stored on the memory device, such as high frequency access patterns ('hot' data) or low frequency access patterns ('cold' data), and others.

The memory device in some embodiments selects the error correction code type during initialization of the memory device, such as during enumeration of the device by the host. The memory device in some embodiments queries the host the system for the memory device's location information. Such location information specifies any one or combination of the layer of the memory hierarchy within which the memory device is implemented, the connection type between the memory hierarchy, the communications distance between the memory device and host and so on. In some implementations, rather than the memory device querying the host, the host informs the memory device of the memory device's location information without a request from the memory device.

After the error correction code type is selected, the memory device carries out memory access requests, such as read operations and write operations, utilizing the selected error correction code type.

In some embodiments, the memory device is removed from the device's current implementation in the system and replaced elsewhere. In some embodiments, the memory device is reconnected to the same host with a different connection type, at a different communications distance, or in a different level of the memory hierarchy regardless of connection type. In other embodiments, the memory device is connected to a different host. In either case, the memory device reselects one of the plurality of error correction code types responsive to detecting the change in connection to a host (whether the same or a different host).

The embodiments described above set forth implementation in which the memory device stores or is otherwise programmed with a variety of different ECC types and the memory device selects one of those ECC types to implement. In other embodiments, the host selects the ECC type and informs the memory device of the selection. The memory device, being programmed with a plurality of different ECC types, implements the ECC type selected by the host. The host selects the ECC type based on one or more criteria including: the type of connection between the memory module and the host, the level of hierarchy that the memory module will operate within, the communications distance between the memory module and the host, and the access patterns of data on the memory module.

For further explanation, FIG. 1 sets forth a functional block diagram of an example system for selecting an error correction code type for a memory device according to embodiments of the present disclosure. The system of FIG. 1 includes a host (102) in the form of a computing system (such as a server). The host (102) includes a computer processor (104) which, in turn, includes one or more central processing unit ('CPU') cores (106) and a memory controller (108). The memory controller is coupled to memory devices (114, 116) in a memory subsystem (126).

The memory subsystem (126) includes two memory devices. Readers will recognize that systems often include any number of memory devices. Each of the memory devices (114, 116) in the example system of FIG. 1 is coupled to the host system through a different connection type. One memory device (114) is coupled to the memory controller (108) over a direct attached memory bus (110). The other memory device (116) is coupled to the memory controller (108) through a memory fabric (112). Examples of direct attached memory include Dual In-Line Memory Module ("DIMM") slots, direct attached Non-volatile RAM ('NVRAM'), and the like. Example of memory fabrics include NVMe over fabrics ('Non-Volatile memory'), fabric attached NVRAM, and the like.

Each connection type has different characteristics. Performance, capacity and reliability, for example, differ between the two types of connections. As such, each connection type is often utilized in a memory subsystem to store different types of data. In some embodiments, the memory subsystem is a memory hierarchy where more frequently accessed data is stored at a higher level of the hierarchy while less frequently accessed data is stored at a lower level of the hierarchy. The higher levels of the memory hierarchy share high performance characteristics while lower levels share greater capacity and reliability. In other systems, no hierarchy exists. In such systems however, the differing characteristics of connection types continue to exist.

The memory devices (114,116) in the example of FIG. 1 include a number of different ECC types (118, 120). Each of the different ECC types (118, 120) has a different code-rate. The term 'code-rate' here generally refers to the strength of the ECC relative to the computational complexity of the ECC. An ECC's strength is defined by the number of errors that that scheme is able to detect and correct. Said another way, a 'code-rate' is the proportion of data that, when encoded, is non-redundant relative to the total amount of data. A 10-bit string with 2-bits of redundant data, therefore has a code-rate of $8/10$ or 80%. The greater the proportion of non-redundant data, the less the computational complexity to encode or decode the data with the ECC scheme. Also, the greater the proportion of non-redundant data, the less strong the ECC scheme is relative to ECC schemes with a lower proportion of non-redundant data. In this way, an ECC scheme that has a high code-rate is one that is computed more rapidly than an ECC scheme that has a low code-rate, but has a lower strength than the ECC scheme with the lower code-rate.

To that end, each memory device (114, 116) selects one of a plurality of error correction code types and carries out memory access requests utilizing the selected error correction code type, thereby storing and accessing ECC encoded data (122, 124). The memory devices in the example memory subsystem of FIG. 1 (126) select one of the ECC types to implement based on a predefined selection criteria. Such predefined selection criteria includes any one or more of connection type (such as direct-attached or fabric), level within a memory hierarchy of the memory subsystem (126), communications distance between the memory device (114, 116) and the host (102), and access patterns of data of the memory device. For less reliable memory fabrics, the memory module selects an ECC type with a lower code-rate—an ECC scheme that provides greater detection and correction with a tradeoff in computational performance (thus latency). For faster (higher throughput, bandwidth or both) direct attached memory busses, the memory device (114) selects an ECC type with a higher code-rate. The memory device (114) in such an example expects to be accessed frequently and data lives on the device a lesser amount of time. To that end, a higher code-rate ECC type enables the memory device (114) to more quickly encode or decode the data being written to or read from the memory device and, because the data is expected to live a shorter amount of time, data errors are less likely to be experienced and thus, the need for stronger ECC is reduced. These are but a few examples among many possible examples of selecting an ECC type based on a tradeoff between latency, as affected by an ECC scheme's computational complexity, and strength of the ECC type. Another parameter which is included in the selection process in some examples is capacity required for the redundant data. Higher strength ECC types tend to require greater redundant data along with the original data. As such, the memory device takes into account, in some instances, the capacity of the memory device, as well as the strength of the ECC type and latency of the ECC type.

For further explanation, several figures are set forth below, each of which includes a flow chart illustrating a method. In various embodiments, each of the methods is carried out in a system similar to that of FIG. 1 which includes a memory device and host, where the memory device includes a plurality of different ECC types.

Figure 2:
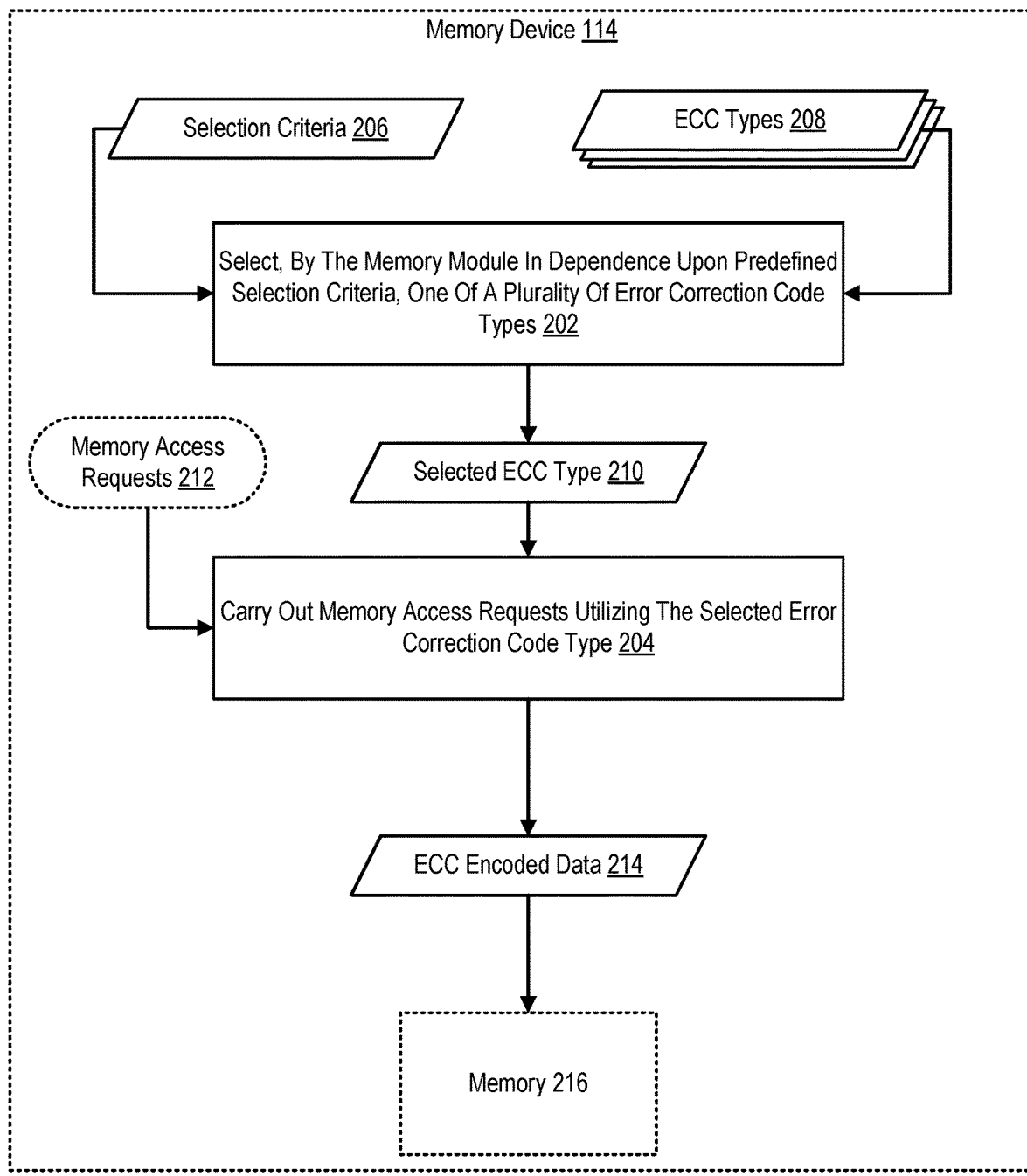
FIG. 2 sets forth a flow chart illustrating an example method of selecting an error correction code type for a memory device according to embodiments of the present disclosure.

FIG. 2 sets forth a flow chart illustrating an example method of selecting an error correction code type for a memory device according to embodiments of the present disclosure. The method of FIG. 2 includes selecting (202), by the memory device (114) in dependence upon predefined selection criteria (206), one (210) of a plurality of error correction code types (208). The predefined selection criteria (206) is any one or combination of: the type of connection between the memory device and the host of the system, the level of memory hierarchy within which the memory device is implemented, the communications distance between the memory device and the host system, the access patterns of data stored on the memory device, such as high frequency access patterns ('hot' data) or low frequency access patterns ('cold' data), and others.

In some embodiments, the memory device (114) selects one ECC type (210) by setting a flag in or more predefined locations within a register of a controller of the memory device designated for such purpose. In various embodiments, the flag is implemented as a bit in a bit string where each bit represents a different ECC type, as a particular value stored in one of a plurality of registers where each different register represents a different ECC type, or in other ways as will occur to readers of skill in the art.

The method of FIG. 2 also includes carrying (204) out memory access requests utilizing the selected error correction code type. The memory device (114) carries (204) out memory access requests by: encoding data received from the host in a write command (212) in accordance with the selected ECC type and writing the encoded data (214) to a location within memory (216); and loading encoded data from a location within memory (216) responsive to a read command from the host and decoding the data in accordance with the selected ECC type prior to transmitting the data to the host.

Figure 3:
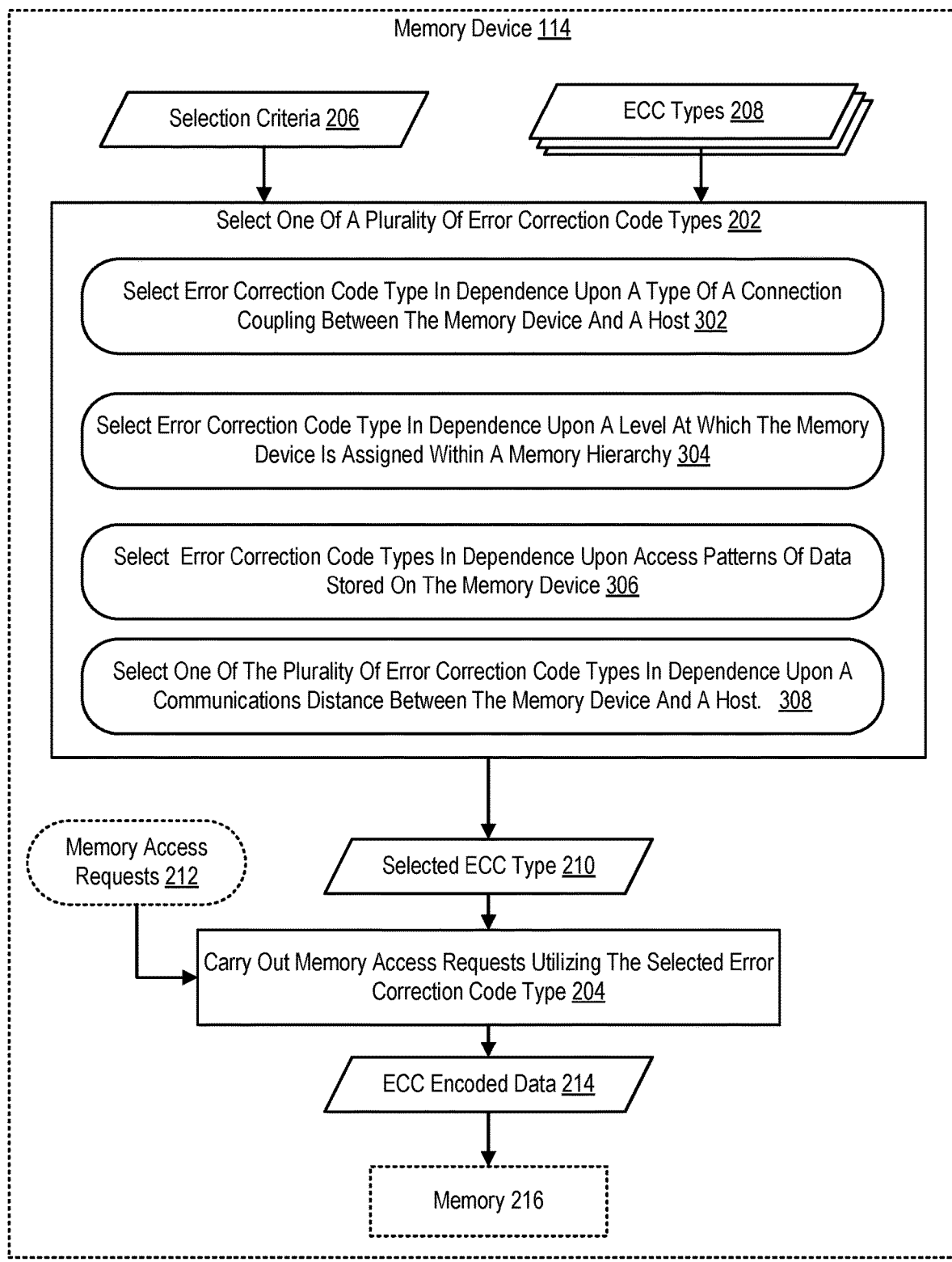
FIG. 3 sets forth a flow chart illustrating another example method of selecting an error correction code type for a memory device according to embodiments of the present disclosure.

For further explanation, FIG. 3 sets forth a flow chart illustrating another example method of selecting an error correction code type for a memory device according to embodiments of the present disclosure. The method of FIG. 3 is similar to the method of FIG. 2 in that the method of FIG. 3 also includes: selecting (202), by the memory device (114) in dependence upon predefined selection criteria (206), one (210) of a plurality of ECC types (208); and carrying (204) out memory access requests (212) utilizing the selected ECC type (210).

FIG. 3 differs from the method of FIG. 2, however, in that in the method of FIG. 3, selecting (202), by the memory device (114) in dependence upon predefined selection criteria (206), one (210) of a plurality of ECC types (208) is carried out in one or more various ways. Although generally set forth in the figures and described here as alternative methods of carrying out the ECC type selection process, readers will recognize that any of the methods described below with respect to FIG. 3 may be carried out in various combinations to effect the ECC type selection process of FIG. 3. That is, nothing in this disclosure precludes multiple different selection criteria from being employed in the selection (202) of ECC types.

In some embodiments of the method of FIG. 3, selecting (202), by the memory device (114) in dependence upon predefined selection criteria (206), one (210) of a plurality of ECC types (208) includes selecting (302) one of the plurality of ECC types in dependence upon a type of a connection coupling between the memory device and a host. In such an embodiment, each ECC type is associated with a particular connection type such as a direct connection or fabric. The memory device (114) selects the ECC type associated with the connection type that exists between the memory device (114) and the host. In one example, a directly connected NVRAM is associated with a with a higher code-rate ECC type than ECC types associated with an NVRAM coupled over a fabric.

In some embodiments of the method of FIG. 3, selecting (202), by the memory device (114) in dependence upon predefined selection criteria (206), one (210) of a plurality of ECC types (208) includes selecting (304) one of the plurality of ECC types in dependence upon a level at which the memory device is assigned within a memory hierarchy. In such embodiments, each ECC type is associated with a different level or range of levels of a memory hierarchy. The 'higher' the level of the hierarchy, the more frequently accessed the data is and the more likely the data is going to change. Thus, the latency of ECC types introduced because of the computational complexity of the encoding and decoding processes associated with a higher level of a memory hierarchy is lower than the latency of ECC types associated with a lower level of the memory hierarchy. Further, because data stored in a higher level of the memory hierarchy is more likely to change ('live' a shorter life in the memory) the likelihood of experiencing memory errors is less than that of memory in a lower level of the memory hierarchy. As such, ECC types associated with the higher levels of the memory hierarchy have a lower redundancy or strength than those associated with lower levels of the memory hierarchy where data is stored and unchanged for longer periods of time and thus more possible to experience a memory error.

In some embodiments of the method of FIG. 3, selecting (202), by the memory device (114) in dependence upon predefined selection criteria (206), one (210) of a plurality of ECC types (208) includes selecting (306) one of the plurality of ECC types in dependence upon access patterns of data stored on the memory device. Access patterns of data stored on the memory device indicate whether the data is more frequently or less frequently accessed. Sometimes, this data is referred to 'hot' data (high access frequency) or 'cold' data (low access frequency). In such embodiments, each ECC type is associated with hot data access patterns or cold data access patterns. In some embodiments, the memory device monitors the access patterns over time and reselects the ECC type based upon a change in the access pattern. Such a dynamic change, in some embodiments, includes partitioning memory into ECC type-specific partitions or migrating data to other memory devices with the first ECC type prior to implementing the reselection of ECC type.

In some embodiments of the method of FIG. 3, selecting (202), by the memory device (114) in dependence upon predefined selection criteria (206), one (210) of a plurality of ECC types (208) includes selecting (306) one of the plurality of ECC types in dependence upon access patterns of data stored on the memory device. Access patterns are defined by the frequency of access of one or more memory locations or data of a memory device. Data that is accessed at a high frequency is referred to as 'hot' data and data that is accessed at a low frequency is referred as 'cold' data. In some embodiments, each ECC type is specified as either a hot or cold ECC type. ECC types that enable lower latency (lower computational complexity for encoding and decoding data) are associated with hot data access patterns and those with higher latency, but greater redundancy are associated with cold data access patterns.

In some embodiments of the method of FIG. 3, selecting (202), by the memory device (114) in dependence upon predefined selection criteria (206), one (210) of a plurality of ECC types (208) includes selecting (308) one of the plurality of ECC types in dependence upon a communications distance between the memory device and a host. The term 'communications distance' refers to a length of the physical, logical, or combination of physical and logical data communications link coupling the memory device to a host. A communications distance includes any combination of a number of hops, switches, controllers, cables, length of cables, length of traces, and so on as will occur to readers of skill in the art. In systems, for example, with multiple memory devices coupled to a host via a memory fabric, the coupling of each memory device in some embodiments is of a different communications distance. In such an embodiment, lower code-rate ECC types are selected for shorter communications distances and higher code-rate ECC types are selected for longer communications distances.

Figure 4:
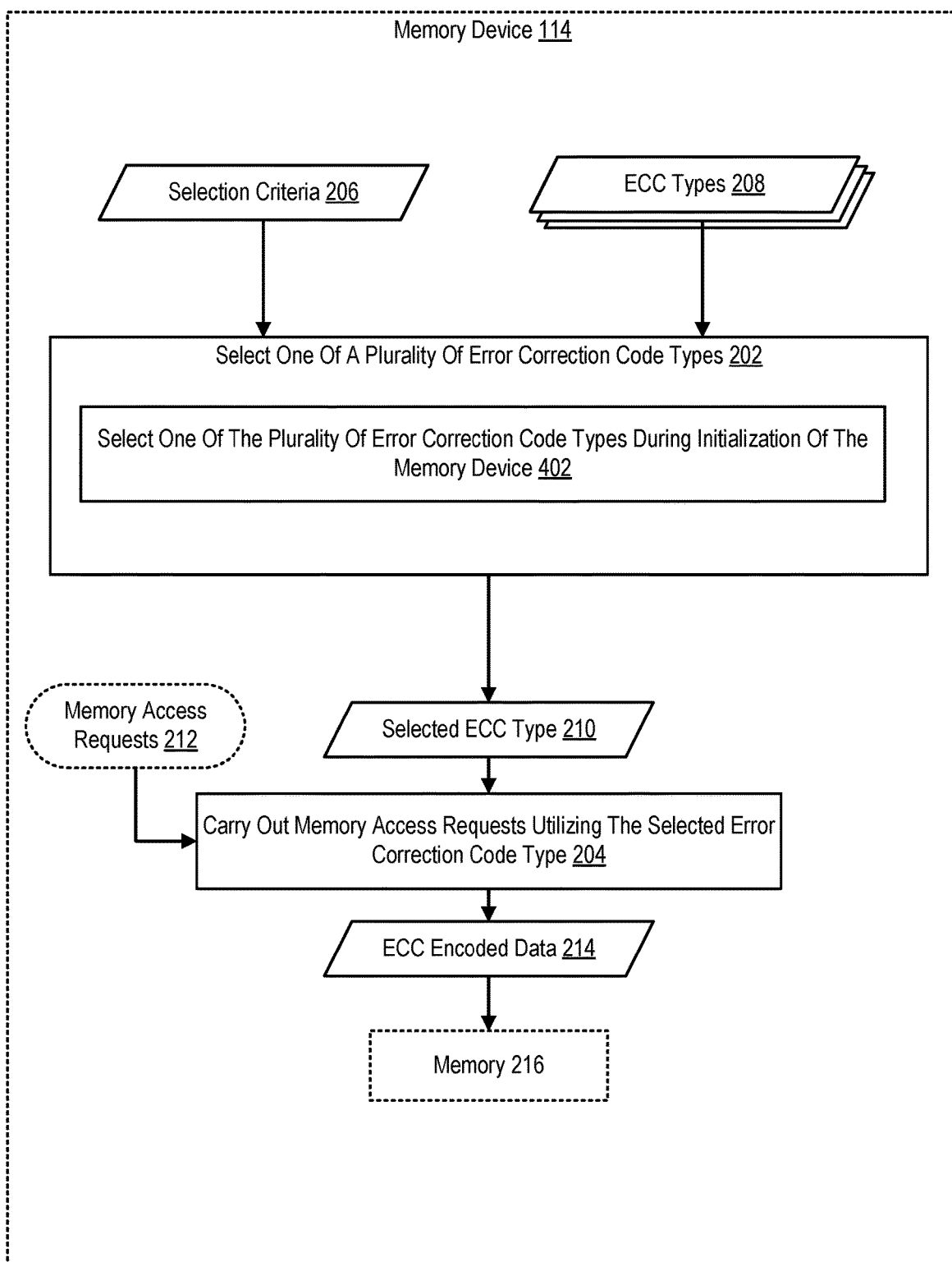
FIG. 4 sets forth a flow chart illustrating another example method of selecting an error correction code type for a memory device is initiated by a memory device according to embodiments of the present disclosure.

FIG. 4 sets forth a flow chart illustrating another example method of selecting an error correction code type for a memory device is initiated by a memory device according to embodiments of the present disclosure. The method of FIG. 4 is similar to the method of FIG. 2 in that the method of FIG. 4 also includes: selecting (202), by the memory device (114) in dependence upon predefined selection criteria (206), one (210) of a plurality of ECC types (208); and carrying (204) out memory access requests (212) utilizing the selected ECC type (210).

FIG. 4 differs from the method of FIG. 2, however, in that selecting (202), by the memory device (114) in dependence upon predefined selection criteria (206), one (210) of a plurality of ECC types (208) is carried out by selecting (402) one of the plurality of ECC types during initialization of the memory device. That is, upon initialization of the memory device, the memory device performs the selection process of the ECC type. In some embodiments, initialization occurs during enumeration of the memory subsystem by the host system. In some embodiments, such initialization occurs after a hot install of the memory device within the system. In embodiments, initialization of the memory device occurs after the boot process of the operating system of the host system.

The selection process described above in some embodiments is initiated by the memory device and in other embodiments initiated by the host. For further explanation, therefore FIG. 5 sets forth a flow chart illustrating another example method of selecting an error correction code type for a memory device in which the selection process is initiated by the host device. The method of FIG. 5 is similar to the method of FIG. 2 in that the method of FIG. 5 also includes: selecting (202), by the memory device (114) in dependence upon predefined selection criteria (206), one (210) of a plurality of ECC types (208); and carrying (204) out memory access requests (212) utilizing the selected ECC type (210).

Figure 5:
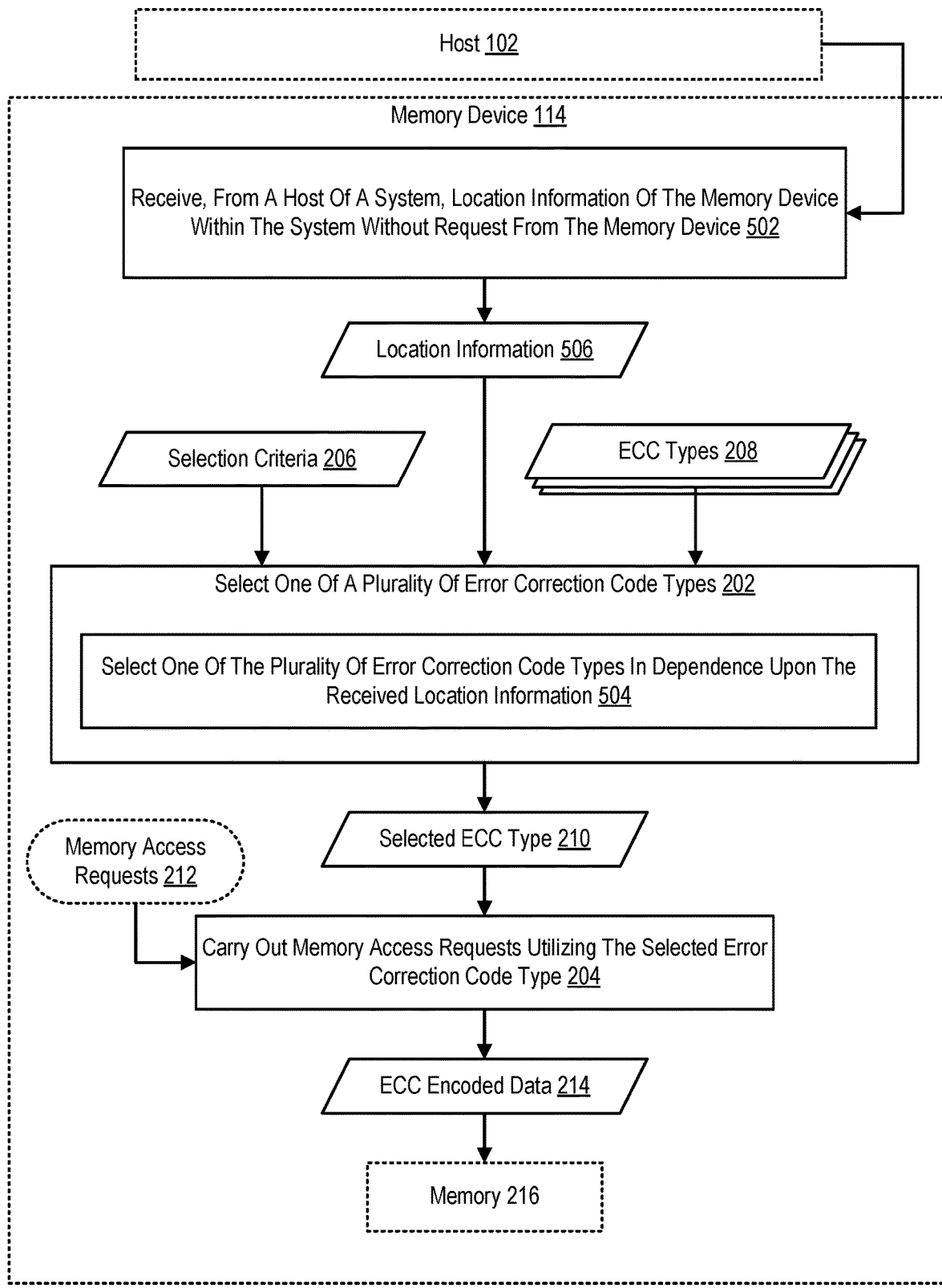
FIG. 5 sets forth a flow chart illustrating another example method of selecting an error correction code type for a memory device in which the selection process is initiated by the host device.

FIG. 5 differs from the method of FIG. 2, however, in that the method of FIG. 5 includes receiving (502), from a host (102) of a system, location information (506) of the memory device within the system without a request from the memory device. The location information (506) refers to any one or more of the level which the memory device is in the memory hierarchy, the connection type coupling the memory device to the host, the communications distance of the coupling between the host and the memory device, the access pattern intended for utilization with the memory device, and so on. To that end, in the method of FIG. 5, selecting (202), by the memory device (114) in dependence upon predefined selection criteria (206), one (210) of a plurality of ECC types (208) includes selecting (504) one of the plurality of ECC types in dependence upon the received location information (506).

Figure 6:
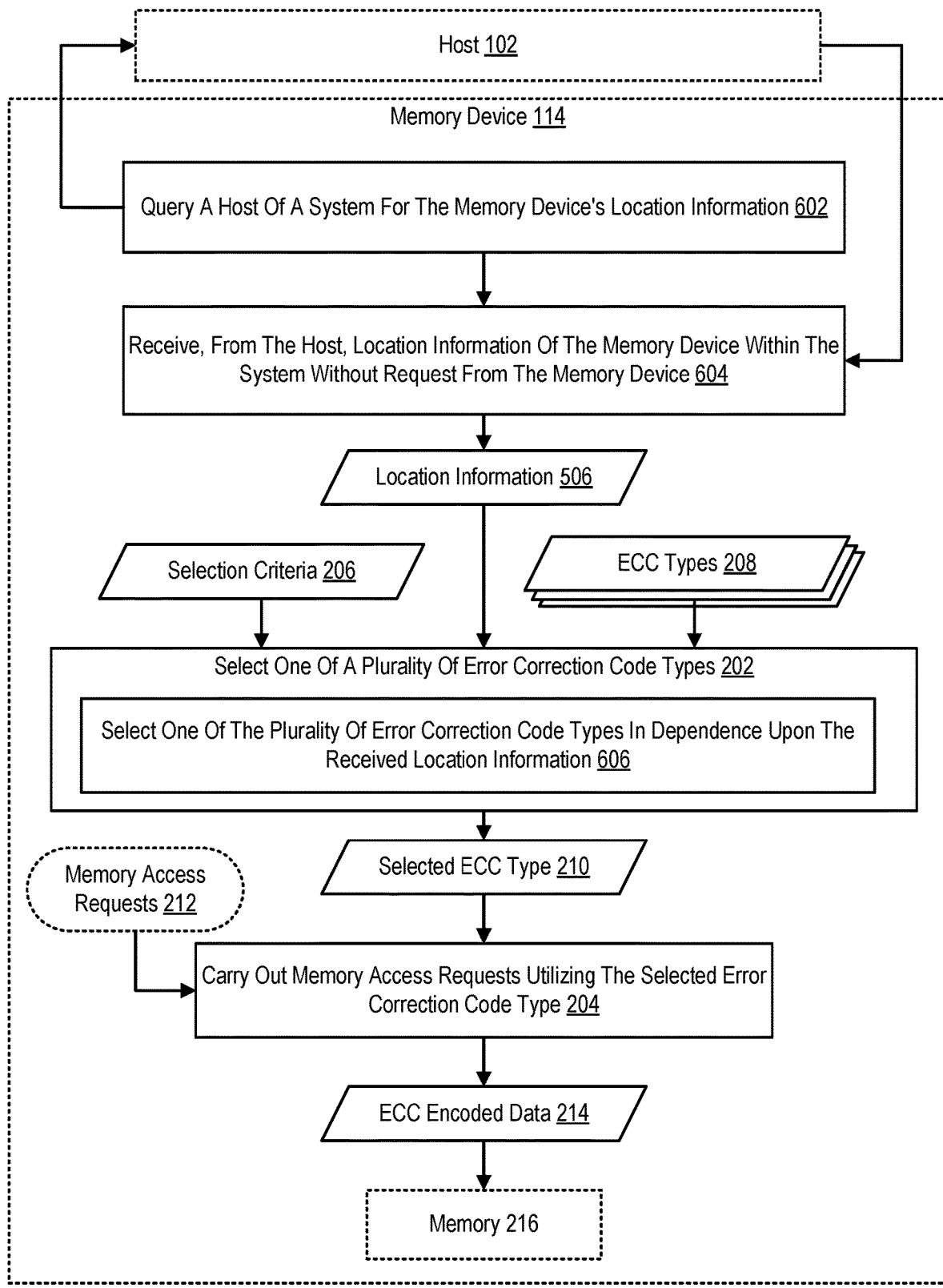
FIG. 6 sets forth a flow chart illustrating another example method of selecting an error correction code type for a memory device in which the selection process is initiated by the memory device according to embodiments of the present disclosure.

FIG. 6 sets forth a flow chart illustrating another example method of selecting an error correction code type for a memory device in which the selection process is initiated by the memory device according to embodiments of the present disclosure. The method of FIG. 6 is similar to the method of FIG. 2 in that the method of FIG. 6 also includes: selecting (202), by the memory device (114) in dependence upon predefined selection criteria (206), one (210) of a plurality of ECC types (208); and carrying (204) out memory access requests (212) utilizing the selected ECC type (210).

FIG. 6 differs from the method of FIG. 2, however, in that the method of FIG. 6 includes querying (602), by the memory device, a host (102) of a system for the memory device's location information (506) and receiving (604), from the host, the location information (506). The memory device, in some embodiments, queries the host by sending an enumeration request to the host. The host returns enumeration information such as device location within a memory hierarchy, connection type, and the like. To that end, selecting (202), by the memory device (114) in dependence upon predefined selection criteria (206), one (210) of a plurality of ECC types (208) in the method of FIG. 6 includes selecting (606) one of the plurality of ECC types in dependence upon the received location information.

Figure 7:
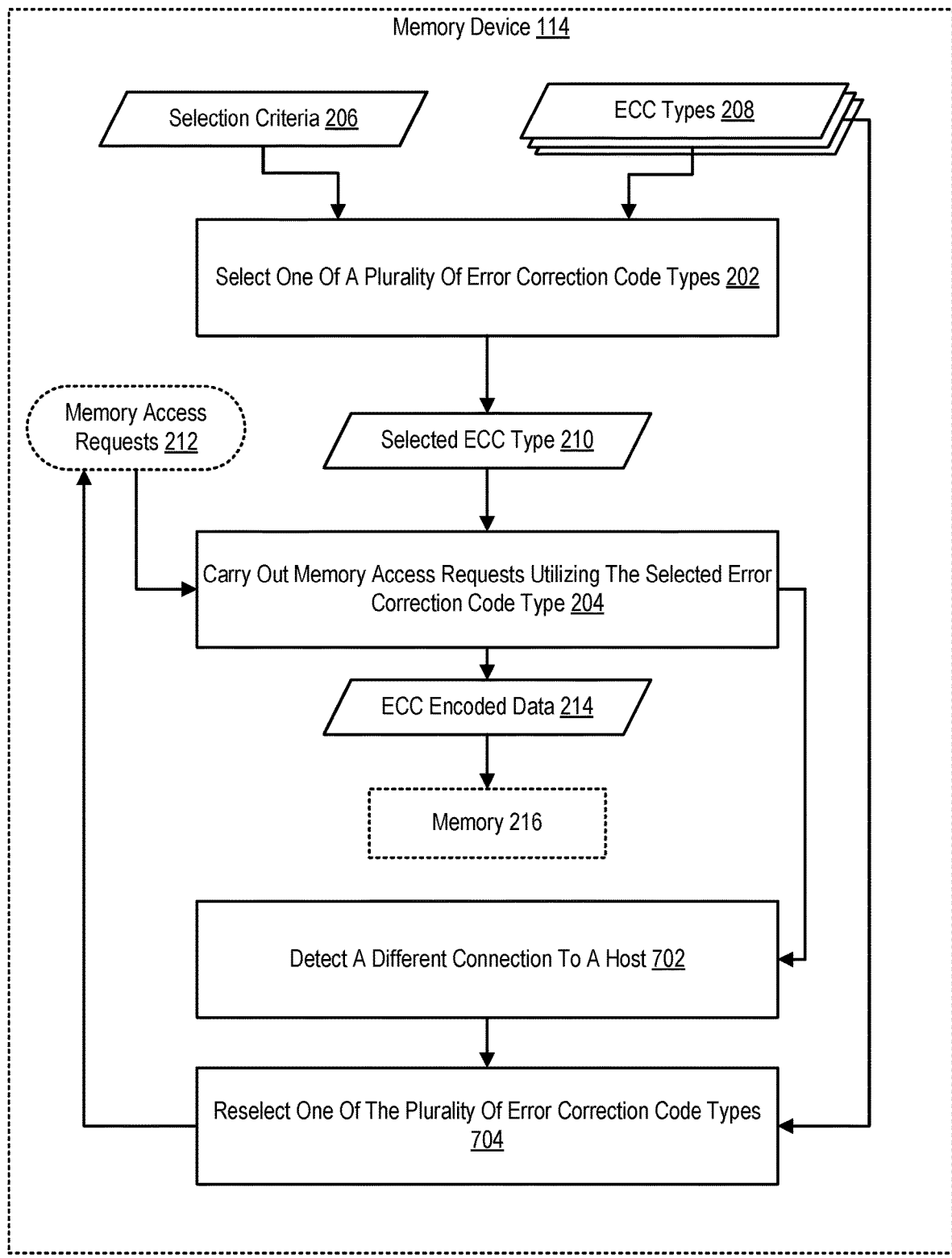
FIG. 7 sets forth a flow chart illustrating another example method of selecting an error correction code type for a memory device according to embodiments of the present disclosure.

For further explanation, FIG. 7 sets forth a flow chart illustrating another example method of selecting an error correction code type for a memory device according to embodiments of the present disclosure. The method of FIG. 7 is similar to the method of FIG. 2 in that the method of FIG. 7 also includes: selecting (202), by the memory device (114) in dependence upon predefined selection criteria (206), one (210) of a plurality of ECC types (208); and carrying (204) out memory access requests (212) utilizing the selected ECC type (210).

FIG. 7 differs from the method of FIG. 2, however, in that the method of FIG. 7 also includes detecting (702) a different connection to a host and reselecting (704) one of the plurality of error correction code types. In the example of FIG. 7, the memory device detects a different connection to the same host. Readers will recognize, however, that the memory device in some embodiments, detects a different connection to a different host. Consider, for example, that a memory device is removed from a directly attached connection of a host and installed in a memory fabric for the same host. In such an example, the memory device reselects (704) the ECC type according to the same predefined selection criteria (206). Consider, as another example, that the memory device is removed from memory fabric of a first host and installed in a memory fabric of a second host. Even in situations where the connection type is the same, the removal of the device from one system and installation into another system initiates a reselection of an ECC type. As mentioned above, the predefined selection criteria in some embodiments identifies multiple different criteria types—connection types, communications distances, memory access patterns, and memory hierarchy levels, for example—such that the connection to the ECC type selected by the memory module when moved from a first host to a second host is different. With a memory device that is programmed with multiple ECC types, the memory device is capable of being moved (either within the same system's memory subsystem or to another system entirely) and the ECC type selected for the memory device is reselected.

The various embodiments described above with respect to FIG. 2-7 include the memory device performing the selection of ECC types. In some embodiments, rather than the memory device performing such ECC type selection, the host device carries out the process. To that end, FIG. 8 sets forth a flow chart illustrating an example method of selecting an error correction code type in which the host of a system carries out the selection process according to embodiments of the present disclosure. The method of FIG. 8 includes determining (802), by a host of a system, a type of connection (810) coupling a memory device to the host. Determining (802) a type of connection coupling the memory device to the host is carried out through enumeration.

Figure 8:
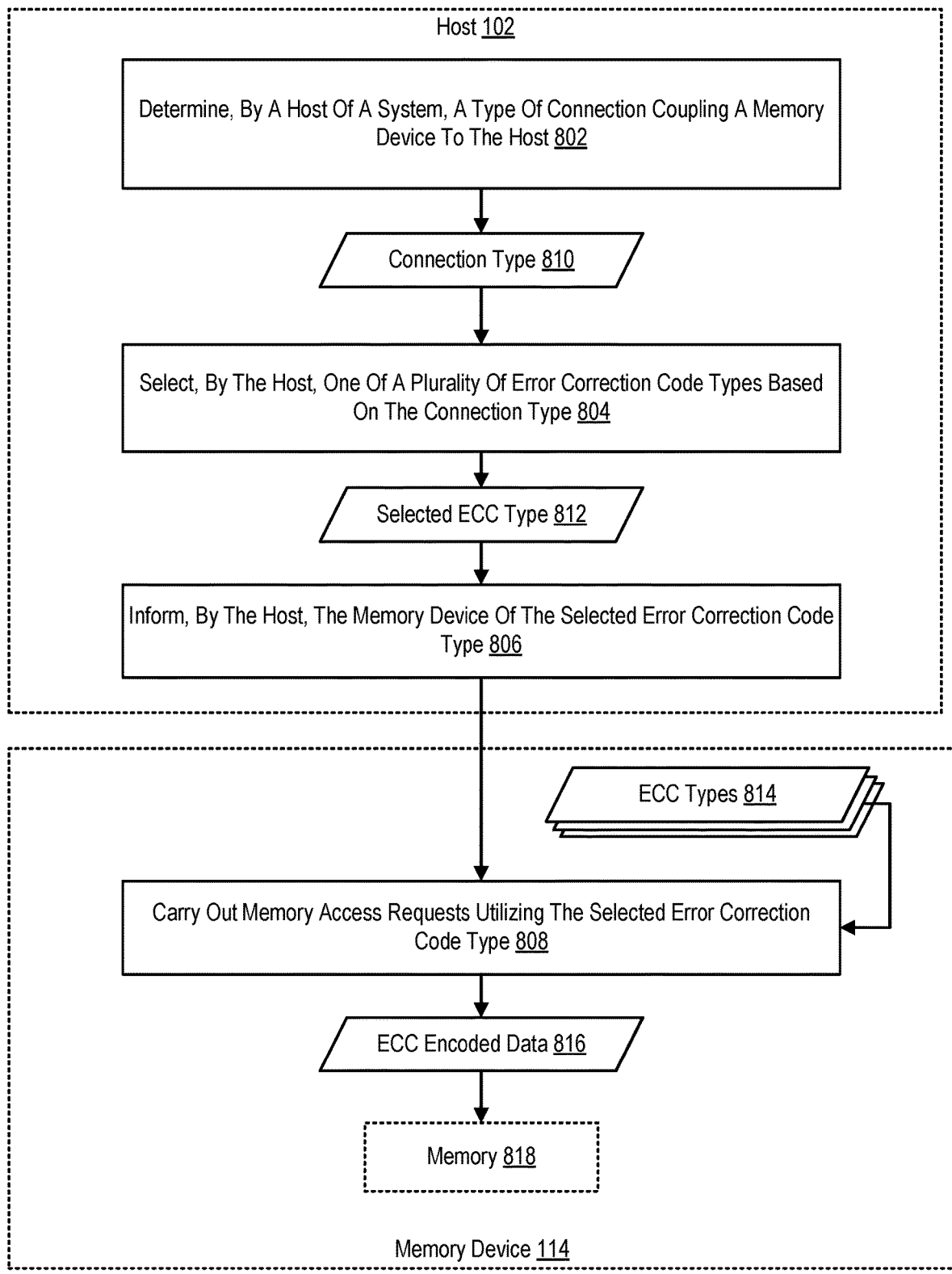
FIG. 8 sets forth a flow chart illustrating an example method of selecting an error correction code type in which the host of a system carries out the selection process according to embodiments of the present disclosure.

The method of FIG. 8 also includes selecting (804), by the host (102), one (812) of a plurality of error correction code types based on the connection type and informing (806), by the host, the memory device of the selected error correction code type. The selection process (804) carried out by the host (102) is implemented in a manner similar to that of the memory device described above. The host includes a number of ECC types and each ECC type is associated with a particular connection type. The ECC type associated with the connection type of the memory device (114) is selected.

The host (102) informs (806) the memory device of the selected ECC type (812) in one of a number of ways. In some embodiments, for example, the host (102) writes a particular data pattern or 'flag' to a memory location within the memory device designated for such purpose. In other embodiments, the memory device, as part of enumeration of the device within the system is configured to receive such information. The memory device includes a number of different ECC types (814) which in some embodiments, the memory device makes known to the host (102).

Upon receiving the ECC type selected by the host (102), the method of FIG. 8 continues by carrying out (808), by the memory device, memory (818) access requests utilizing the selected error correction code. That is, the memory device (114) encodes and stores data (816) in memory (818) upon a write command and loads, decodes, and transmits data to the host upon a read command.

Figure 9:
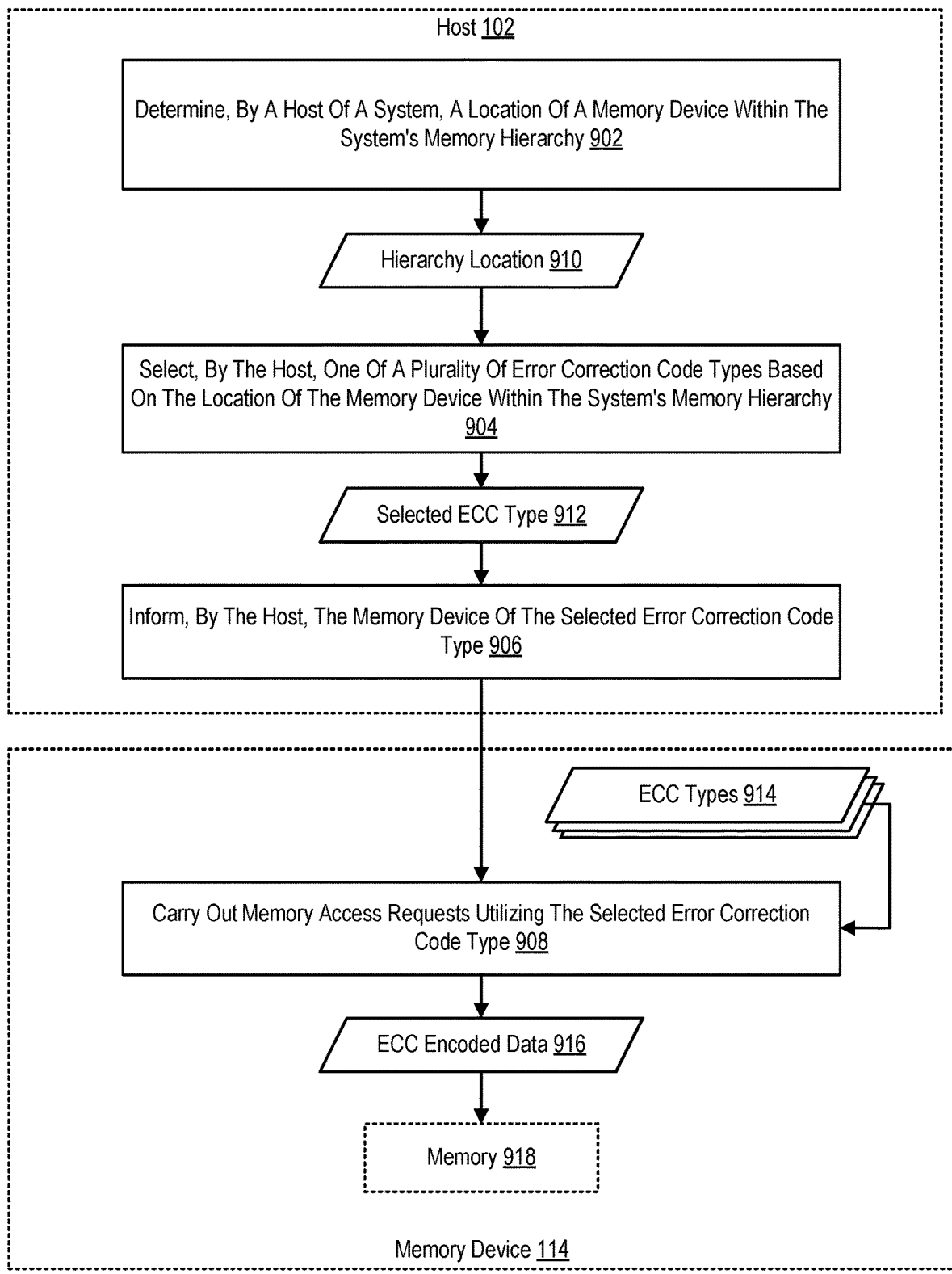
FIG. 9 sets forth a flow chart illustrating another example method of selecting an error correction code type in which the host of a system carries out the selection process according to embodiments of the present disclosure.

For further explanation, FIG. 9 sets forth a flow chart illustrating another example method of selecting an error correction code type in which the host of a system carries out the selection process according to embodiments of the present disclosure. The method of FIG. 9 includes determining (902), by a host of a system, a layer of a memory device within the system's memory hierarchy. Determining (902), by a host of a system, a layer of a memory device within the system's memory hierarchy is carried out in some embodiments by querying a memory system configuration. In some embodiments, particular slots or data communications ports are associated with different layers of the hierarchy. In such embodiments, the host determines the hierarchy layer of the memory device by identifying the slot or port in which the memory device is installed.

The method of FIG. 9 also includes selecting (904), by the host (102), one of a plurality of ECC types based on the layer (910) of the memory device within the system's memory hierarchy and informing (906), by the host, the memory device of the selected ECC type (912). The selection process (904) carried out by the host (102) is implemented in a manner similar to that of the memory device described above. The host includes a number of ECC types and each ECC type is associated with a particular memory hierarchy layer. The ECC type associated with the hierarchy layer of the memory device (114) is selected.

The host (102) informs (906) the memory device of the selected ECC type (912) in one of a number of ways. In some embodiments, for example, the host (102) writes a particular data pattern or 'flag' to a memory location within the memory device designated for such purpose. In other embodiments, the memory device, as part of enumeration of the device within the system is configured to receive such information.

Upon receiving the ECC type selected by the host (102), the method of FIG. 9 continues by carrying out (908), by the memory device, memory (918) access requests utilizing the selected error correction code. That is, the memory device (914) encodes and stores data (916) in memory (918) upon a write command and loads, decodes, and transmits data to the host upon a read command.

Figure 10:
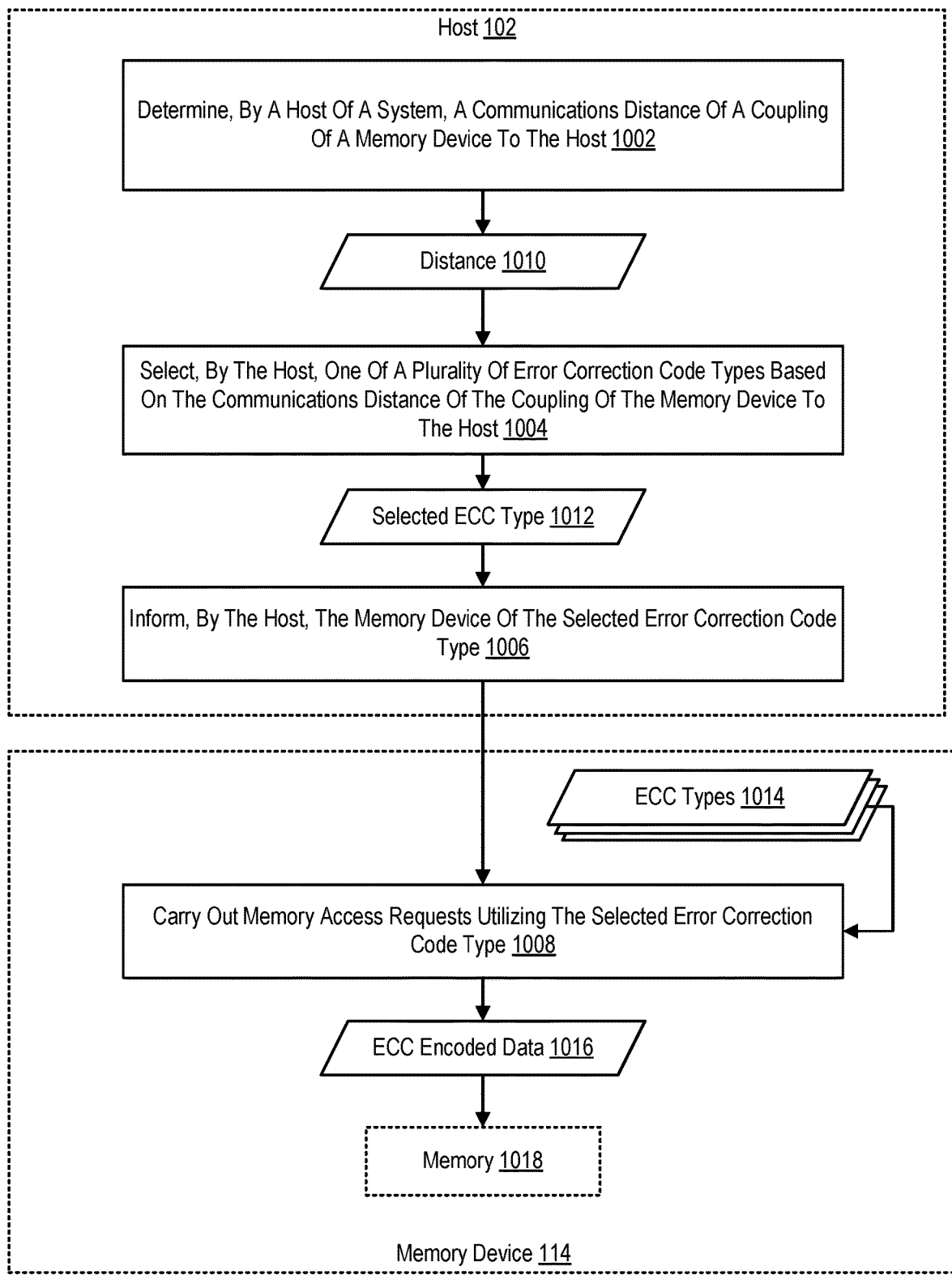
FIG. 10 sets forth a flow chart illustrating another example method of selecting an error correction code type in which the host of a system carries out the selection process according to embodiments of the present disclosure.

For further explanation, FIG. 10 sets forth a flow chart illustrating another example method of selecting an error correction code type in which the host of a system carries out the selection process according to embodiments of the present disclosure. The method of FIG. 10 includes determining (1002), by a host of a system, a communications distance of a coupling of a memory device to the host. Determining (1002) a communications distance of a coupling of a memory device to the host is carried out in some embodiments by enumerating the fabric or other data communications channel coupling the memory device to the host.

The method of FIG. 10 also includes selecting (1004), by the host (102), one of a plurality of ECC types based on the communications distance (1010) of the coupling of the memory device to the host of the memory device and informing (1006), by the host, the memory device of the selected ECC type (1012). The selection process (1004) carried out by the host (102) is implemented in a manner similar to that of the memory device described above. The host includes a number of ECC types and each ECC type is associated with a particular memory hierarchy layer. The ECC type associated with the hierarchy layer of the memory device (114) is selected.

The host (102) informs (1006) the memory device of the selected ECC type (1012) in one of a number of ways. In some embodiments, for example, the host (102) writes a particular data pattern or 'flag' to a memory location within the memory device designated for such purpose. In other embodiments, the memory device, as part of enumeration of the device within the system is configured to receive such information.

Upon receiving the ECC type selected by the host (102), the method of FIG. 10 continues by carrying out (1008), by the memory device, memory (1018) access requests utilizing the selected error correction code. That is, the memory device (1014) encodes and stores data (1016) in memory (1018) upon a write command and loads, decodes, and transmits data to the host upon a read command.

Example embodiments are described largely in the context of a fully functional computer system. Readers of skill in the art will recognize, however, that the present disclosure also is embodied in a computer program product disposed upon computer readable storage media for use with any suitable data processing system. Such computer readable storage media includes any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

Embodiments can include a system, a method, and/or a computer program product. The computer program product includes a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium, for example, is not limited to an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network in some embodiments includes copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure in some embodiments are implemented as assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions in some embodiments execute entirely on the user's computer, partly on the user's computer, as a stand-alone software package, partly on the user's computer and partly on a remote computer or entirely on the remote computer or server. In the latter scenario, the remote computer in some embodiments is connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to some embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein is an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method of selecting an error correction code type for a memory device, the method comprising:
   selecting, by the memory device based on predefined selection criteria, one of a plurality of error correction code types, the memory device configured to store error correction code (ECC) encoded data; and
   executing memory access requests utilizing the selected error correction code type.

2. The method of claim 1, wherein selecting one of the plurality of error correction code types based on predefined selection criteria further comprises:
   selecting one of the plurality of error correction code types based on a type of a connection coupling between the memory device and a host.

3. The method of claim 2, further comprising:
   responsive to detecting a different connection to a host, reselecting one of the plurality of error correction code types.

4. The method of claim 1, wherein selecting one of the plurality of error correction code types based on predefined selection criteria further comprises:
   selecting one of the plurality of error correction code types based on a level at which the memory device is assigned within a memory hierarchy.

5. The method of claim 1, wherein selecting one of the plurality of error correction code types based on predefined selection criteria further comprises:
   selecting one of the plurality of error correction code types based on access patterns of data stored on the memory device.

6. The method of claim 1, wherein selecting one of the plurality of error correction code types based on predefined selection criteria further comprises:
selecting one of the plurality of error correction code types based on a communications distance between the memory device and a host, wherein the communications distance refers to a length of a data communications link coupling the memory device and the host.

7. The method of claim 1, wherein selecting one of the plurality of error correction code types based on predefined selection criteria further comprises:
selecting one of the plurality of error correction code types during initialization of the memory device.

8. The method of claim 1 further comprising:
receiving, from a host of a system, location information of the memory device within the system without request from the memory device, wherein selecting one of the plurality of error correction code types further comprises selecting one of the plurality of error correction code types based on the received location information.

9. The method of claim 1 further comprising:
querying, by the memory device, a host of a system for location information of the memory device; and
receiving, from the host, the location information, wherein selecting one of the plurality of error correction code types further comprises selecting one of the plurality of error correction code types in dependence upon the received location information.

10. The method of claim 1, wherein each of the plurality of error correcting code types comprises a different code-rate.

11. A memory device for selecting an error correction code type, the memory device comprising:
a memory including a plurality of error correction code types; and
error correction selection logic configured to:
select, based on predefined selection criteria, one of a plurality of error correction code types, the memory device configured to store error correction code (ECC) encoded data, and
execute memory access requests utilizing the selected error correction code type.

12. The memory device of claim 11, wherein the error correction selection logic is further configured to carry out selecting one of the plurality of error correction code types based on predefined selection criteria by selecting one of the plurality of error correction code types based on a type of a connection coupling between the memory device and a host.

13. The memory device of claim 12, wherein the error correction selection logic is further configured to reselect one of the plurality of error correction code types responsive to detecting a different connection to a host.

14. The memory device of claim 11, wherein the error correction selection logic is further configured to select one of the plurality of error correction code types by selecting one of the plurality of error correction code types based on a level at which the memory device is assigned within a memory hierarchy.

15. The memory device of claim 11, wherein the error correction selection logic is further configured to select one of the plurality of error correction code types based on predefined selection criteria by selecting one of the plurality of error correction code types based on access patterns of data stored on the memory device.

16. The memory device of claim 11, wherein the error correction selection logic is further configured to select one of the plurality of error correction code types based on predefined selection criteria by selecting one of the plurality of error correction code types based on a communications distance between the memory device and a host, wherein the communications distance refers to a length of a data communications link coupling the memory device and the host.

17. The memory device of claim 11, wherein the error correction selection logic is further configured to select one of the plurality of error correction code types based on predefined selection criteria by selecting one of the plurality of error correction code types during initialization of the memory device.

18. The memory device of claim 11 wherein the error correction selection logic is further configured to:
receive, from a host of a system, location information of the memory device within the system without request from the memory device, wherein selecting one of the plurality of error correction code types further comprises selecting one of the plurality of error correction code types based on the received location information.

19. The memory device of claim 11, wherein the error correction selection logic is further configured to:
query a host of a system for location information of the memory device; and
receive, from the host, the location information, wherein selecting one of the plurality of error correction code types further comprises selecting one of the plurality of error correction code types based on the received location information.

20. The memory device of claim 11, wherein each of the plurality of error correcting code types comprises a different code-rate.

21. A method of selecting an error correction code type, the method comprising:
determining, by a host of a system, a type of connection coupling a memory device to the host, wherein the memory device comprises a plurality of error correction code types;
selecting, by the host, one of the plurality of error correction code types based on the connection type; and
informing, by the host, the memory device of the selected error correction code type.

22. The method of claim 21, wherein upon receiving the error correction code type selected by the host, the memory device is configured to execute memory access requests utilizing the selected error correction code.

23. A method of selecting an error correction code type, the method comprising:
determining, by a host of a system, a layer of a memory device within a memory hiearchy of the system's memory hierarchy, wherein the memory device comprises a plurality of error correction code types;
selecting, by the host, one of the plurality of error correction code types based on the layer of the memory device within the system's memory hierarchy; and
informing, by the host, the memory device of the selected error correction code type.

24. The method of claim 23, wherein upon receiving the error correction code type selected by the host, the memory device is configured to execute memory access requests utilizing the selected error correction code.

25. A method of selecting an error correction code type, the method comprising:
determining, by a host of a system, a communications distance of a coupling of a memory device to the host, wherein the memory device comprises a plurality of error correction code types;

selecting, by the host, one of a plurality of error correction code types based on the communications distance of the coupling of the memory device to the host, wherein the communications distance refers to a length of a data communications link coupling the memory device and the host; and informing, by the host, the memory device of the selected error correction code type.

26. The method of claim 25, wherein upon receiving the error correction code type selected by the host, the memory device is configured to execute memory access requests utilizing the selected error correction code.

\* \* \* \* \*